Dec. 15, 1953
R. E. ERMEY
2,662,458
GRAPE HOE GUIDED BY TRACTOR STEERING MECHANISM
Filed Jan. 17, 1950
3 Sheets-Sheet 1
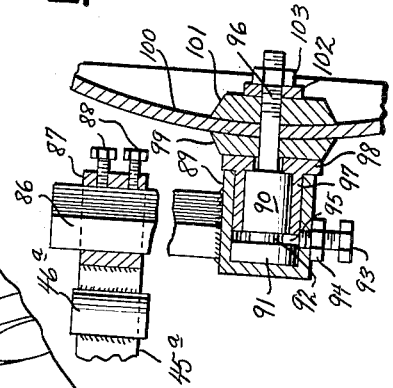
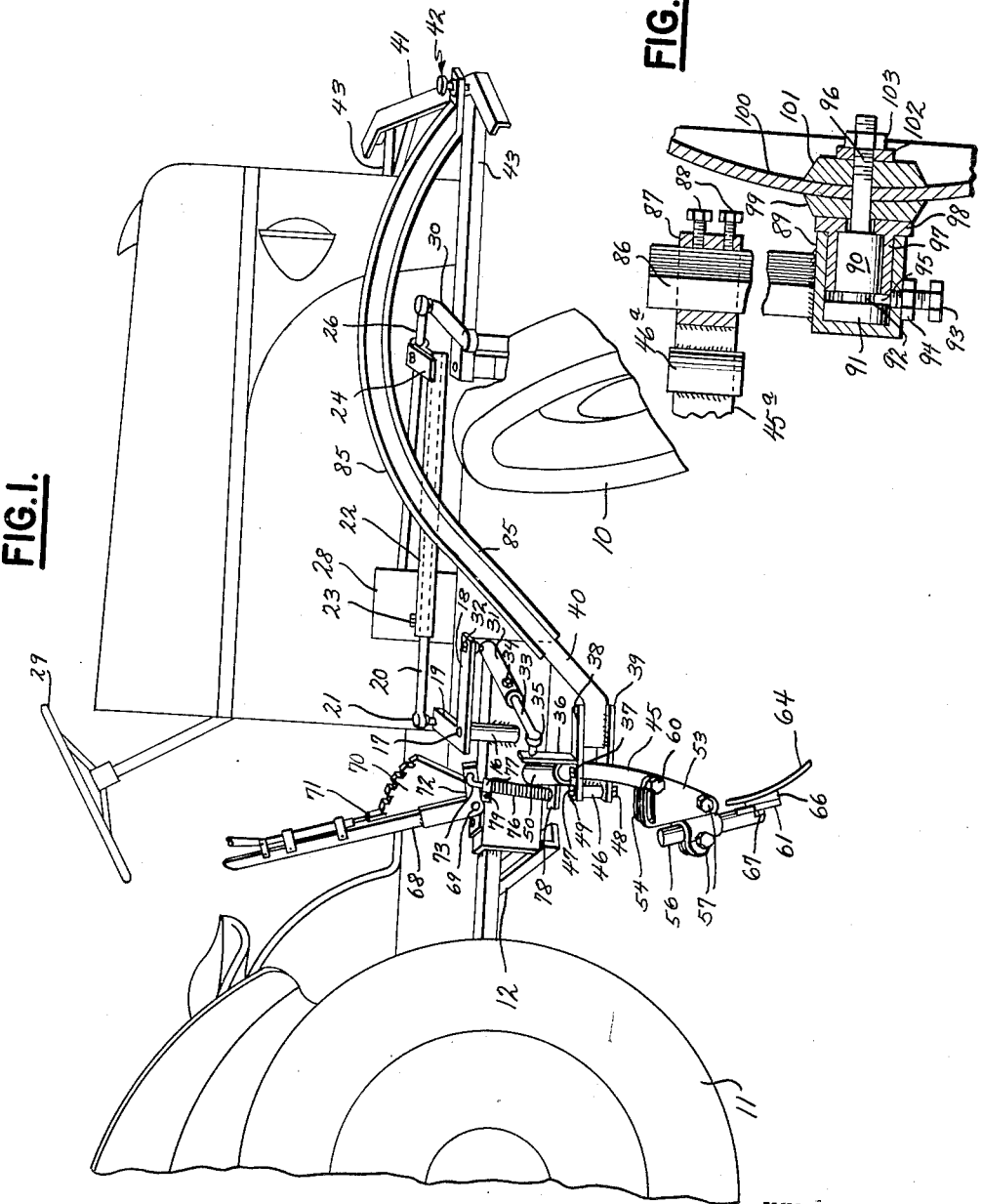
INVENTOR.
ROBERT E. ERMEY
BY
*Wilkinson + Mawhinney*
ATTORNEYS Dec. 15, 1953  R. E. ERMEY  2,662,458
GRAPE HOE GUIDED BY TRACTOR STEERING MECHANISM
Filed Jan. 17, 1950  3 Sheets-Sheet 2
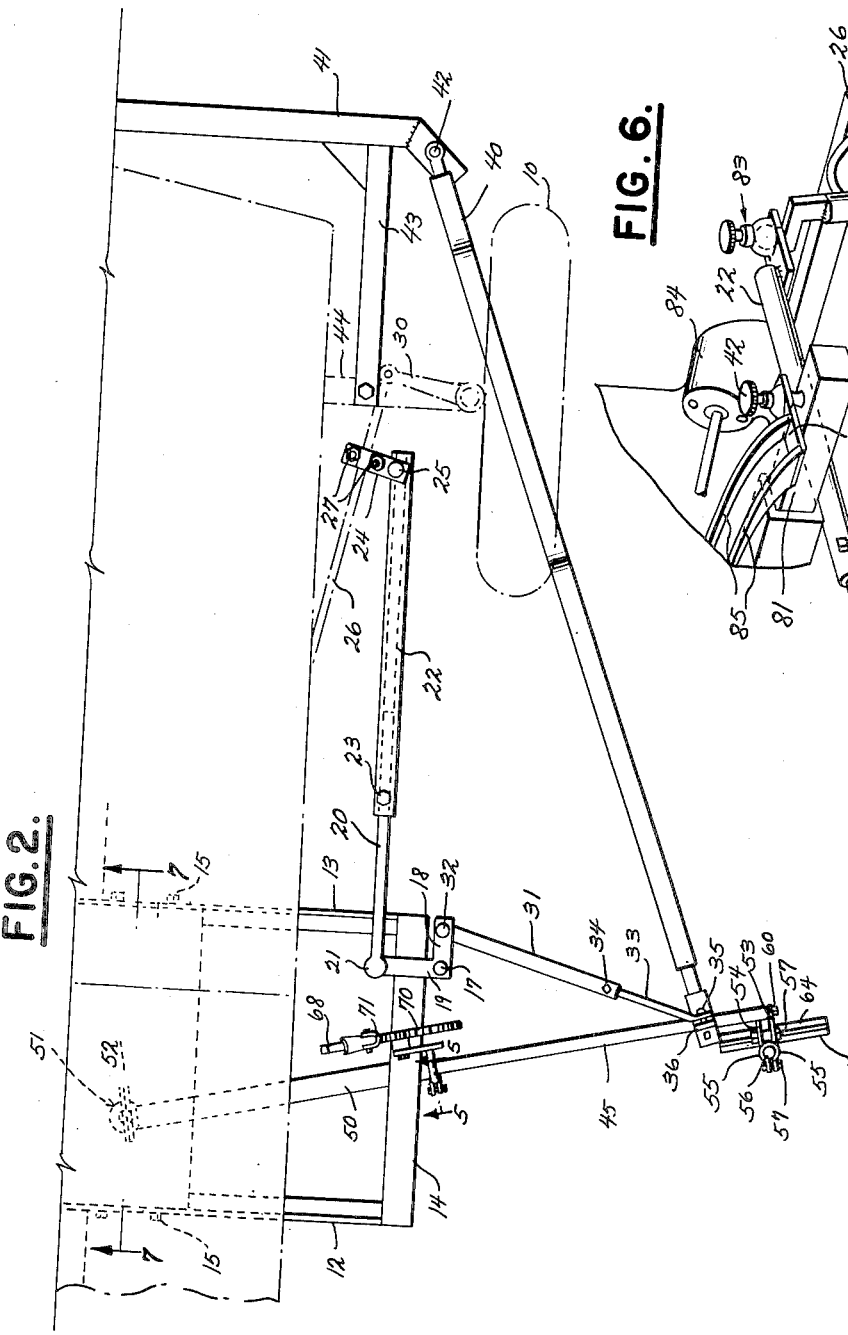
INVENTOR.
ROBERT E. ERMEY
BY
Wilkinson & Mawhinney
ATTORNEYS Dec. 15, 1953  R. E. ERMEY  2,662,458
GRAPE HOE GUIDED BY TRACTOR STEERING MECHANISM
Filed Jan. 17, 1950
3 Sheets—Sheet 3

INVENTOR.
ROBERT E. ERMEY
BY
Wilkinson & Mawhinney
ATTORNEYS

Patented Dec. 15, 1953

2,662,458

UNITED STATES PATENT OFFICE 2,662,458

GRAPE HOE GUIDED BY TRACTOR STEERING MECHANISM

Robert E. Ermey, Wapato, Wash.

Application January 17, 1950, Serial No. 139,044

2 Claims. (Cl. 97—47.06)

1

The present invention relates to improvements in a grape hoe guided by tractor steering mechanism and has for an object to provide a device of this kind which can be mounted upon a conventional tractor.

Another object of the present invention is to provide an improved grape hoe that can be operated by the steering gear of a tractor so that weeds and grass can be removed from beneath trellis and between the vines and posts of a vineyard.

A further object of the present invention is to provide an improved device of this character which is moved away from and toward the tractor during the normal steering of the tractor.

A still further object of the present invention is to provide an improved structure in which a basic frame is attached to a tractor for removably supporting the grape hoe and its adjusting means. With the present improved arrangement, after the basic frame has been secured to the tractor, the grape hoe and its operating means can be removed in about thirty seconds so that the tractor can be used with other implements without interference from the grape hoe.

The present invention aims to provide an improved device of this type in which full advantage is taken of the turning radius of the steering gear.

The present invention also aims to provide an improved grape hoe in which the hoe blade can be easily and quickly raised or lowered and tilted or turned.

The present invention contemplates providing an improved structure in which all of the hoe blade adjusting devices are located so that they do not interfere with or catch the vines.

It is a further aim of the present invention to provide an improved grape hoe for attachment to a tractor, the use of which requires no practice and can be operated by any person who is capable of operating a tractor.

With the foregoing and other objects in view, the invention will be hereinafter more fully described and more particularly pointed out in the appended claims.

Figure 3:
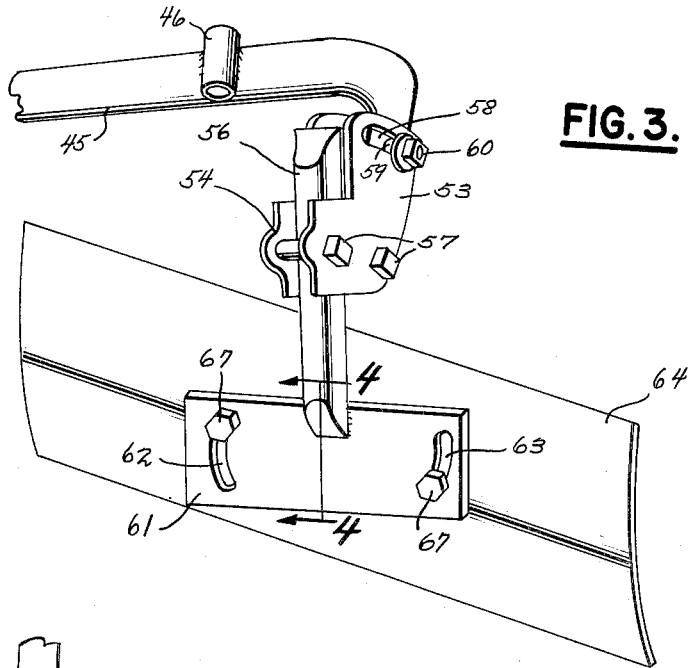

In the drawings, in which the same parts are denoted by the same reference numerals throughout the several views, Figure 1 is a perspective view of the improved grape hoe constructed in accordance with the present invention and illustrated as attached to a tractor, Figure 2 is a top plan view of the same, Figure 3 is a perspective view of the hoe blade and its supporting means,

2

Figure 4:
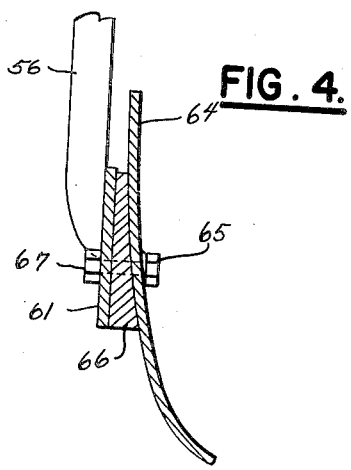
Figure 5:
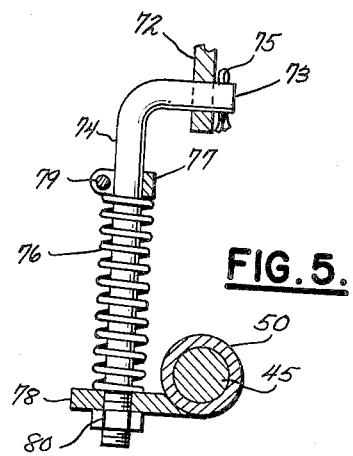
Figure 7:
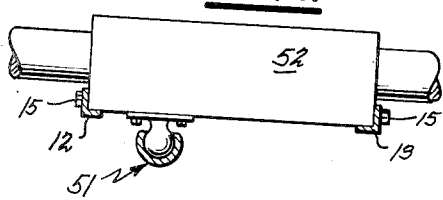

Figure 4 is a sectional view taken on the line 4—4 of Figure 3 and looking in the direction of the arrows, Figure 5 is a sectional view taken on the line 5—5 of Figure 2 and looking in the direction of the arrows, Figure 6 is a fragmentary perspective view showing the improved hoe attached to a tractor of a different type from that shown in Figure 1, Figure 7 is a sectional view taken on the line 7—7 of Figure 2 and looking in the direction of the arrows, and Figure 8 is a fragmentary side elevational view of the disk assembly with parts broken away and in section.

Referring more particularly to the drawings, 10 and 11 indicate front and rear wheels, respectively, of a conventional type of tractor. A basic frame which can be substantially U-shaped comprises a pair of arms 12 and 13 and a connecting strip 14 for joining one end of each of the arms 12 and 13. The arms 12 and 13 and the connecting strip 14 can be of angle iron construction and the arms 12 and 13 are secured to the bottom of the transmission housing of the tractor by the four bottom bolts 15 of the transmission housing. A socket member 16 is secured to the outer face of the strip 14 by welding or the like and freely receives a pivot element or shaft 17 which pivotally attaches a bellcrank lever comprising a forward leg 18 and a rear leg 19. This bellcrank lever constitutes a force transferring mechanism.

A telescopic adjustment rod 20 has its rear end connected to the free end portion of the rear leg 19 of the bellcrank lever by a ball and socket connection 21 and its forward end portion slidably received by a tube 22. A set screw 23 is carried by the tube 22 for retaining the rod 20 in its adjusted position within the tube 22. The forward end portion of the tube 22 is connected to a clamp bar 24 by a ball and socket connection 25. The clamp bar 24 is secured to the right-hand tractor steering drag link 26 by a U bolt 27. The rear end of the steering drag link 26 is connected by conventional gearing 28 to the steering wheel 29 of the tractor and the forward end portion of the link 26 is connected in a conventional manner to the tractor steering arm 30 which in turn is operatively connected to the wheel 10 of the tractor.

A sleeve 31 has its inner end portion pivotally connected to the free end portion of the forward leg 18 of the bellcrank lever by a ball and socket joint 32. A telescopic adjustment rod 33 has its inner end portion slidably received by the sleeve 31 and a set screw 34 is mounted on the sleeve 31 for retaining the rod 33 in its adjusted position. The outer end portion of the rod 33 is connected by a ball and socket joint 35 to a standard 36 which is secured by a bolt or the like 37 to the upper surface of a bar 38 intermediate the ends thereof. The bar 38 and a similar bar 39 have their forward end portions secured as by welding or the like to the upper and lower faces, respectively, of the rear end reduced portion of a beam 40. The beam 40 is substantially arcuate in the direction of its length and terminates in a flattened forward end portion which is connected to a front end bumper 41 by a conventional ball attachment trailer hitch 42. The bumper 41 is supported by horns 43 which are mounted on the chassis 44 of the tractor.

The bars 38 and 39 are held in vertically aligned spaced apart relation by the rear end portion of the beam 40 and receive therebetween a slide shaft 45 which has secured thereto as by welding or the like, intermediate its ends a tubular bearing 46. The slide shaft 45 is pivotally connected to the beam 40 by a pin 47 which extends through suitable holes in the bars 38 and 39 and the bearing 46. The pin 47 is held in place by its head 48 and a cotter key 49.

The inner end portion of the shaft 45 is telescopically received by a tube 50 which is connected by a ball and socket joint 51 to the bottom of the transmission housing 52 of the tractor. The outer end portion of the slide shaft 45 is bent downwardly and flattened and is received between a pair of spaced apart substantially L-shaped clamp plates 53 and 54. The clamp plates 53 and 54 have cooperating semicircular portions 55 which embrace a round shank 56 therebetween by means of bolts 57. The plates 53 and 54 are provided with arcuate slots 58. A bolt 59 extends through the slots 58 and the flattened outer end portion of the slide shaft 45 and is maintained in the desired adjusted position by a nut 60.

The lower end portion of the shank 56 has secured to its forward face as by welding or the like a shank plate 61 which is provided with arcuate shaped slots 62 and 63 which extend in opposite directions. A hoe blade 64 is adjustably mounted on the shank plate 61 by bolts 65 which extend through suitable openings in the hoe blade 64 and the slots 62 and 63. A hoe blade spacer or filler plate 66 is positioned between the shank plate 61 and the hoe blade 64 and the bolts 65 extend through appropriate openings in the spacer 66. The hoe blade 64 and the spacer 66 are held in assembled relation on the shank plate 61 by nuts 67 which are threadedly received by the bolts 65. It will be noted that the rear face of the hoe blade 64 is slightly convex and the forward face of the spacer 66 has a similar curvature.

A lever 68 is pivotally connected as at 69 to the cross strip 14 and is held in adjusted position by a quadrant 70 and a cooperating ratchet 71. The forward arm 72 of the lever 68 receives the offset portion 73 of a hoe blade depth adjustment shaft 74. A cotter pin 75 extends through a suitable opening in the free end portion of the offset 73 for retaining the connection between the forward arm 72 of the lever and the offset portion 73 of the shaft 74. A coil spring 76 encircles the shaft 74 and its upper end engages a split collar 77 and its lower end engages an apertured lug 78 which is carried by the tube 50. The collar 77 can be adjusted to any desired position on the shaft 74 to vary the tension of the spring 76 and the collar 77 is held in the desired adjusted position by a screw 79. The lower end portion of the shaft 74 extends through the apertured lug 78 and is screw threaded to receive a nut 80 which forms an operative connection between the shaft 74 and the tube 50.

For the type of tractor shown in Figure 6 which does not have a forward bumper, the beam 40 has its flattened forward end portion attached to the front cultivator bar 81 by a conventional ball attachment trailer hitch 42. The forward end portion of the tube 22 is connected to the right-hand steering arm 30 of the tractor by a ball and socket connection 83. The steering link 26 is connected by a conventional steering gear 84 to the steering wheel of the tractor. In some of the conventional types of tractors the basic frame 12, 13, 14 can be attached to the side of the tractor by the four standard attachment bolts of the tractor.

The face 14 of the frame can be of channel shape and have a size of two inches by six inches and is supported by the two arms 12 and 13 which can be of angle iron formation two inches by two inches by one-fourth inch. The strip 14 can be braced by a bar one inch long by one-fourth inch thick and appropriate gussets necessary for support. All of these parts can be of welded construction. The slide shaft 45 can be one and one-half inches in diameter. The rods 20 and 33 can be constructed by welding a tie rod line to a three-fourth inch rod which is telescoped into a three-fourth inch inside diameter tube 22 and sleeve 31, respectively. The beam 40 can be constructed of one and one-fourth inch tubing which is reinforced at the top and bottom with one inch by one-fourth inch bar fins 85. All parts of the grape hoe and its attachment are jig and welded construction throughout.

In the use of the device when the operator of the tractor turns the steering wheel 29 so that the tractor is turned to the right the right-hand tractor steering drag link 26 is moved forwardly causing the tube 22 and its adjustment rod 20 to move forwardly. This will cause the rear leg 19 of the bellcrank lever to be swung forwardly on its pivot 17 so that the forward leg 18 of the bellcrank lever will be swung outwardly thereby moving the sleeve 31 and its rod 33 outwardly of the tractor. This outward movement of the rod 33 through its ball and socket connection 35 with the standard 36, which in turn is secured with the beam 40, will cause the beam 40 to swing outwardly on the hitch 42. Since the beam 40 is connected to the slide shaft 45 through the bearing 46 and the bars 38 and 39, the slide shaft 45 will also be moved outwardly of the tractor. The slide shaft through its connection with the hoe blade 64 will cause the hoe blade to move outwardly from the tractor.

When the operator turns the steering wheel 29 so that the tractor is turned to the left, the parts will move in the reverse direction and the hoe blade is moved inwardly towards the tractor.

The coil spring 76 acts upon the tube 50 to resiliently urge the hoe blade 64 into the ground with even tension regardless of the position of the tractor. This arrangement protects the hoe blade and the tractor if the hoe blade encounters a hard buried object and it will also allow accumulated trash to pass under the hoe blade without damage to the hoe. The hoe blade can be raised and lowered with respect to the ground by the proper manipulation of the lever 68 through its connection with the tube 50.

The pitch of the hoe blade 64 can be set by loosening the nut 60 on the bolt 59 and moving the clamp plates 53 and 54 and the shank 56 until the desired pitch of the hoe blade 64 has been obtained. The nut 60 is then tightened to maintain the parts in the adjusted position.

The desired tilt can be given to the hoe blade by means of the shank plate 61 and the arcuate slots 62 and 63. The nuts 67 will be loosened and the hoe blade adjusted to the desired tilt. The nuts 67 can then be tightened and the hoe blade will be retained in the desired tilted position.

The throw of the rods 20 and 33 can be adjusted by loosening the set screws 23 and 34 and moving the rods with respect to their tube 22 and sleeve 31, respectively. The set screws then can be tightened to hold the rods in their adjusted positions.

In the operation of the device, as shown on the tractor illustrated in Figure 6, the movement of the right-hand steering arm 30 will move the tube 22 and the rod 20 in the same manner as will the drag link 26 of the tractor shown in Figure 2.

The tube 22 and its rod 20 can be replaced by a hydraulic cylinder which is equipped with appropriate pump, valves and pipe lines to provide a complete hydraulic operating unit.

If desired a disk can be substituted for the hoe 64 and the means for effecting this substitution are shown in Figure 8 of the drawing. A slide shaft 45a has its inner end portion telescopically received by the tube 50 and is provided intermediate its ends with a bearing 46a similar to the bearing 46 of the slide shaft 45. The upper end portion of a shank 86 which is substantially rectangular in cross section is adjustably received by a collar 87 which is formed on the outer end portion of the shaft 45a. Set screws 88 are mounted on the collar 87 for bearing against the shank 86 to secure it in the desired vertically adjusted position. A socket member 89 is secured to or formed integral with the lower end portion of the shank 86. The rear end portion of a bearing shaft 90 is received by the socket 89. The shaft 90 has an enlarged head portion 91 at its rear end and an annular groove 92 immediately forwardly of the head 91.

A set screw 93 is carried by the socket 89 and extends through a lock nut 94 which if desired may be secured to the socket 89. The set screw 93 is provided with a reduced portion 95 which is adapted to be received by the groove 92 of the shaft 90 to prevent axial movement of the shaft with respect to the socket 89. The forward end portion 96 is of reduced diameter and the forward portion thereof is threaded. A bearing 97 is received by the socket 89 and surrounds that portion of the shaft 90 which is disposed forwardly of the groove 92. The bearing 97 has a head 98 which engages the forward edge of the socket 89. An outside bumper 99 is mounted upon the reduced portion 96 of the shaft 90 and a disk 100 is also mounted on the reduced portion of the shaft 90. An inside bumper 101 is disposed upon the portion 96 of the shaft 90. A lock washer 102 and a nut 103 are received by the threaded portion of the shaft 90.

It is obvious that various changes and modifications may be made in the details of construction and design of the above specifically described embodiment of this invention without departing from the spirit thereof, such changes and modifications being restricted only by the scope of the following claims.

What I claim is:

1. A grape hoe for attachment to a tractor comprising a basic frame mounted on the chassis of the tractor, a socket member on the basic frame, a bellcrank lever pivotally mounted on said member, a rod pivotally connected at one end to one leg of said bellcrank lever, a tube pivotally connected at one end to a steering link of the tractor and its opposite end portion telescopically receiving the other end portion of said rod, a sleeve pivotally connected at one end to the other leg of the bellcrank lever, a second rod having one end portion telescopically received by the opposite end portion of said sleeve, a beam pivotally connected at one end to the tractor, a pair of spaced apart bars each having one end portion secured to the other end portion of said beam, a standard on one of said bars, the other end of said second rod being pivotally connected to said standard, means for securing said rods in said tube and sleeve in preselected adjusted positions, a second tube secured at one end to said frame, a slide shaft having one end portion telescopically received by said second tube and its other end portion extending through and beyond said bars, a bearing on said slide shaft, a connecting element carried by said bars for connecting said bearing to said bars, and a cultivator on the extended end of said slide shaft.

2. A grape hoe as claimed in claim 1 characterized by the fact that a depth adjustment shaft is connected to said second tube, that a control member is connected to said depth adjustment shaft, and that resilient means are interposed between said depth adjustment shaft and said second tube for resiliently urging the hoe blade towards the ground.

ROBERT E. ERMEY.

References Cited in the file of this patent

UNITED STATES PATENTS

| Number | Name | Date |
|---|---|---|
| 238,846 | Brown | Mar. 15, 1881 |
| 888,635 | Morris | May 26, 1908 |
| 1,141,732 | Vance | June 1, 1915 |
| 1,226,793 | Morgan | May 22, 1917 |
| 1,833,895 | Etbauer | Dec. 1, 1931 |
| 2,206,283 | Jacobs et al. | July 2, 1940 |
| 2,298,540 | Mott | Oct. 13, 1942 |
| 2,419,331 | Best | Apr. 22, 1947 |
| 2,437,581 | Wray | Mar. 9, 1948 |
| 2,521,549 | Smith | Sept. 5, 1950 |
| 2,522,227 | Hostetter | Sept. 12, 1950 |
| 2,539,174 | Baideme et al. | Jan. 23, 1951 |
| 2,539,864 | Rutherford | Jan. 30, 1951 |